T. M. RIVERS.
TIDAL HYDRAULIC POWER PLANT.
APPLICATION FILED MAY 18, 1916.
1,268,625.
Patented June 4, 1918.
2 SHEETS—SHEET 1.
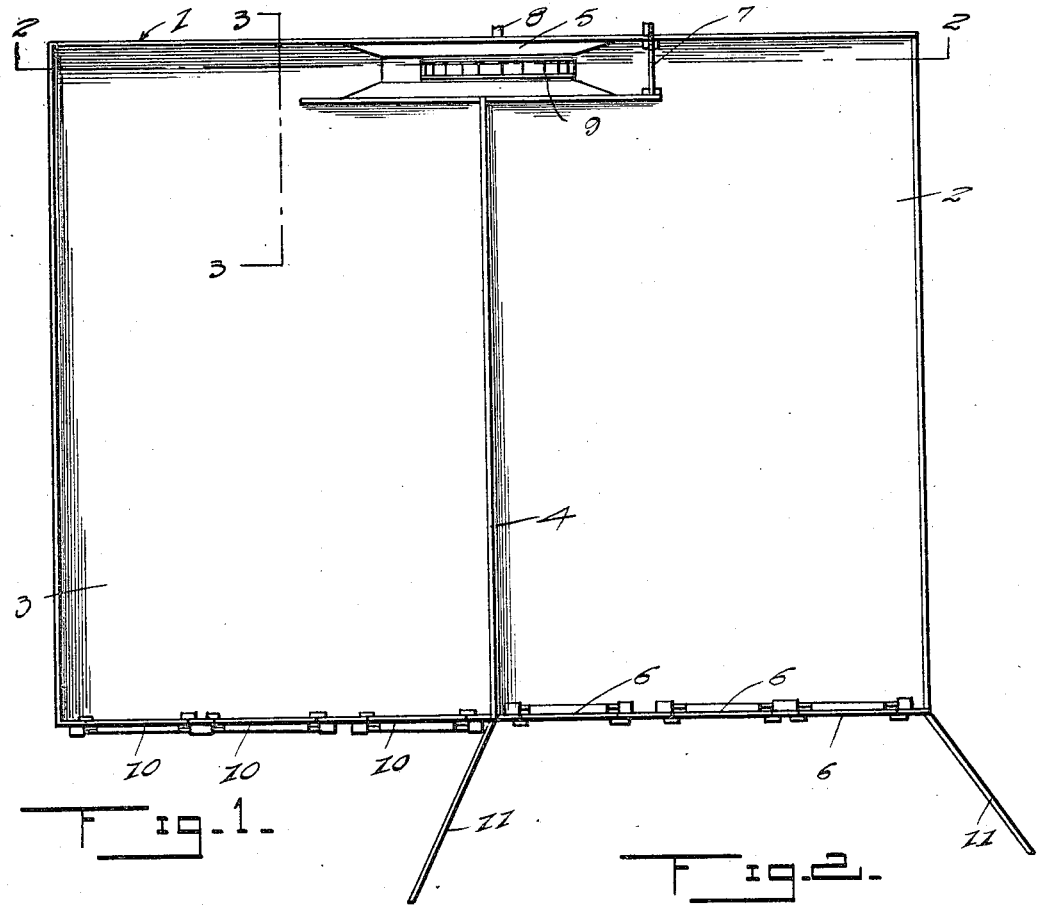
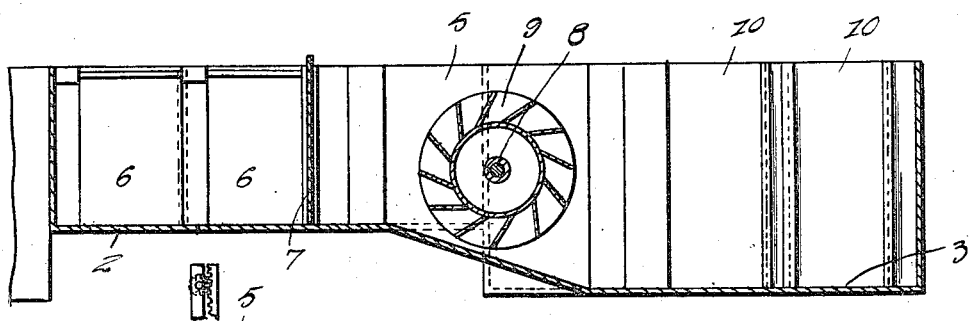
Inventor
T. M. Rivers.
Witness T. M. RIVERS.
TIDAL HYDRAULIC POWER PLANT.
APPLICATION FILED MAY 18, 1916.
1,268,625.
Patented June 4, 1918
2 SHEETS—SHEET 2.
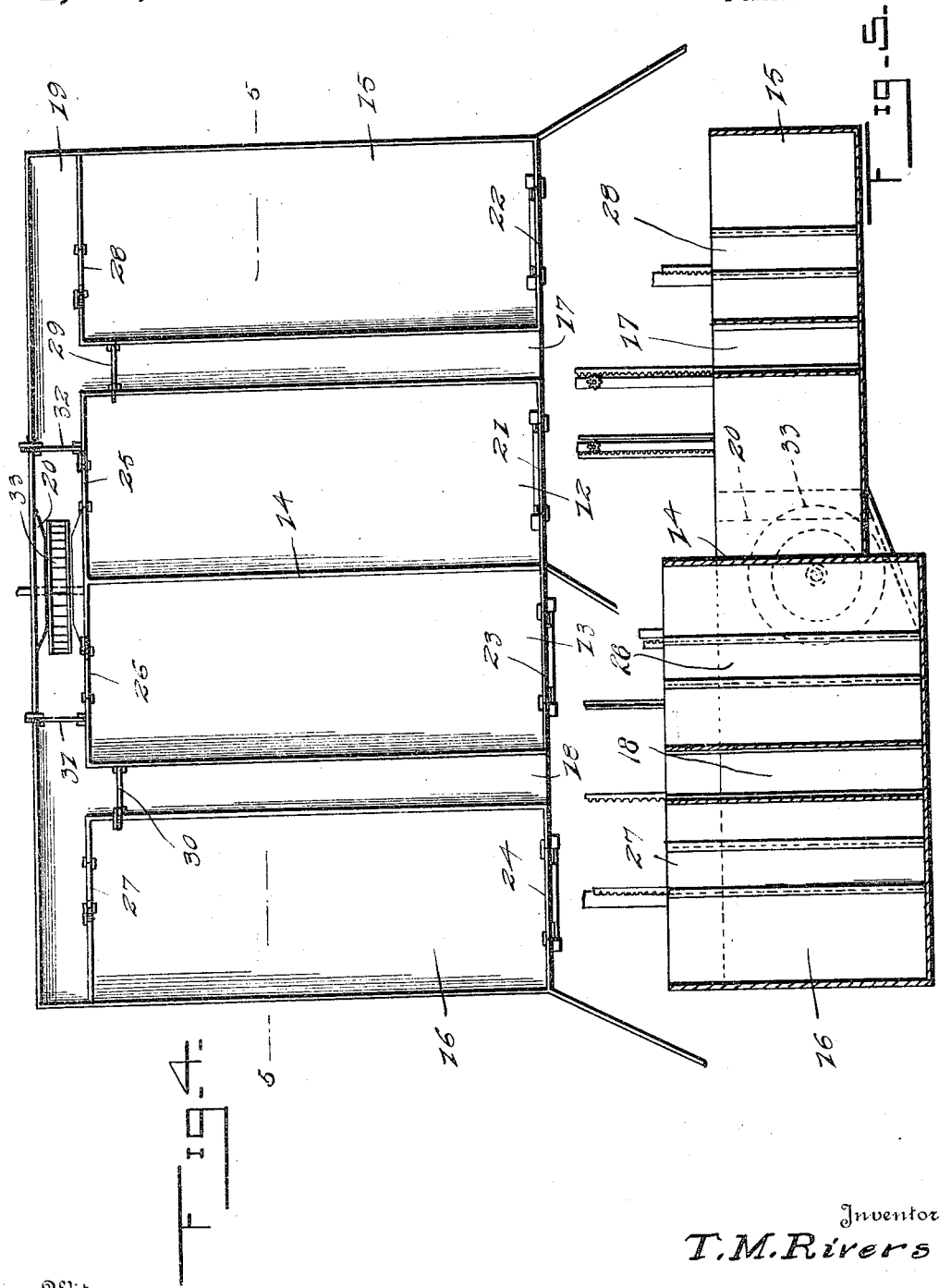
Inventor
T. M. Rivers.
Witness

UNITED STATES PATENT OFFICE.

THOMAS M. RIVERS, OF KISSIMMEE, FLORIDA.

TIDAL HYDRAULIC-POWER PLANT.

1,268,625.　　　　Specification of Letters Patent.　　Patented June 4, 1918.

Application filed May 18, 1916. Serial No. 98,391.

*To all whom it may concern:*

Be it known that I, THOMAS M. RIVERS, a citizen of the United States, residing at Kissimmee, in the county of Osceola and State of Florida, have invented certain new and useful Improvements in Tidal Hydraulic-Power Plants; and I do hereby declare the following to be a full, clear, and exact description of the invention, such as will enable others skilled in the art to which it appertains to make and use the same.

The primary object of this invention is the provision of a novel, cheap, durable and efficient hydraulic power plant that can be readily installed and will admit of maximum power being derived from the stored driving water.

Another object of the invention is the provision of a tidal hydraulic power plant, of such construction that its efficiency will not be decreased at spring and neap tides.

A further object of the invention is the provision of a device of this character having main accumulating and discharge reservoirs and auxiliary accumulating and discharge reservoirs, that can be rendered operative should the main reservoirs become damaged.

Other objects will appear and be better understood from that embodiment of my invention of which the following is a specification, reference being had to the accompanying drawings forming a part thereof, in which:

Figure 1 is a top plan view of the main accumulating and discharge reservoirs,

Fig. 2 is a section, taken on the line 2—2 of Fig. 1,

Fig. 3 is a section, taken on the line 3—3 of Fig. 1,

Fig. 4 is a top plan view of a modified form of device,

Fig. 5 is a section taken on the line 5—5 of Fig. 4.

Referring to the drawings in detail, and to the construction shown in Figs. 1, 2 and 3, the numeral 1 designates a tidal hydraulic power plant as an entirety consisting of a body having a driving water accumulating reservoir 2, and a discharge reservoir 3. The depth of the accumulating reservoir is less than the depth of the discharge reservoir 3, and the said reservoirs are separated from each other by means of a partition wall 4. The rear end of the partition wall 4 is spaced from the rear wall of the body, and a flume 5 establishes communication between the reservoirs 2 and 3 and has the lower wall thereof inclined, as shown more particularly in Fig. 2.

The front wall of the reservoir 2 is provided with inwardly swinging spaced gates 6, which are adapted to be moved inwardly by the pressure of the water when the tide rises, to admit water entering and filling the reservoir 2.

A gate 7 is located at that end of the flume 5 which extends into the reservoir 2, and when the said gate 7 is moved to open position the water in the reservoir 2 will pass through the flume 5 and into the reservoir 3. A shaft 8 has one end extending through the rear wall of the body and through the flume 5 and journaled in the inner wall of the flume 5.

Located within the flume 5 and mounted on the inner end of the shaft 8 is a water wheel 9. This water wheel 9 is spaced slightly above the lower wall of the flume and during the passage of the water through the flume the wheel 9 will be rotated to effect rotation of the shaft 8, the outer end of the shaft being designed to be connected in any suitable manner with any mechanism adapted to be operated.

The front wall of the reservoir 3 is provided with a plurality of spaced and outwardly swinging gates 10, which are adapted to be closed by the pressure of water at high tide. When the tide is rising the water closes the gates 10 in the reservoir 3 and opens the gates 6. The water then passes into the reservoir 2 until the said reservoir is filled, after which operation the gates 6 move by gravity to closed position. When the ebb is well advanced, the gates 10 in the reservoir 3 open by pressure of water inside and the water which passes through the flume 5, from the reservoir 2, passes into the reservoir 3 and outwardly through the openings for the gates 10 in the front wall of the reservoir 3 and empties into the sea of other body of water.

A pair of diverging walls 11 are located in front of the reservoir 2 and serve to collect a large amount of water therebetween and also to facilitate the passage of the water into the reservoir 2.

In the construction illustrated in Figs. 4 and 5, is shown a body having a main accumulating and a main discharge reservoir 12 and 13, similar in construction to the reservoirs 2 and 3 shown in Fig. 1 and divided by means of a partition wall 14, which extends throughout the length of the reservoirs 12 and 13. A pair of auxiliary reservoirs 15 and 16 are located, respectively, on opposite sides of the reservoirs 12 and 13, the reservoir 15 being auxiliary to the main reservoir 12 and reservoir 16 auxiliary to the main discharge reservoir 13. The walls of the reservoirs 13 and 16 are higher than the walls of the reservoirs 12 and 15 to shut out the waves and breakers from the reservoirs 13 and 16 and permit the waves and breakers to flow over the reservoirs 12 and 15 to permit rapid filling of the same. Said reservoirs 15 and 16 are arranged in spaced relation to the reservoirs 12 and 13 to provide canals 17 and 18. A third canal, designated 19, extends across the rear of the body, and a flume 20, similar to the flume 5 in Fig. 1 is located within the canal 19 at a point in rear of the main reservoirs 12 and 13.

The front walls of the reservoirs 12 and 15 are provided with inwardly opening gates 21 and 22, similar to the gates 6 in the reservoir 2 in Fig. 1, and the front walls of the reservoirs 13 and 16 are provided with outwardly opening gates 23 and 24, similar to the gates 10 in the reservoir 3 in Fig. 1.

The rear walls of the reservoirs 12, 13, 15 and 16 are provided with manually operated gates, designated, respectively, by the numerals 25, 26, 28 and 27, and similar manually operated gates, designated 29 and 30, are located in the canals 17 and 18 adjacent the points of communication between the canals 17 and 18 and the canal 19.

Located within the canal 19 is a pair of manually operated gates 31 and 32, which are located, respectively, at the opposite ends of the flume 20 and spaced therefrom.

Under normal conditions, the gates 22, 24, 27 and 28 in the auxiliary reservoirs 15 and 16 are closed, the main reservoirs 12 and 13 being only in operation. When the reservoirs 12 and 13 are, alone, in operation, the gates 31 and 32 at the opposite ends of the flume 20 are closed and the gates 25 and 26 in the rear walls of the reservoirs 12 and 13 opened, so that the water collected in the reservoir 12, during high tide, can pass through the flume 20 into the reservoir 13, and when the tide recedes the water in passing through the flume 20 into the reservoir 13 operates a water wheel 33, which is located within the flume 20, and similar in construction to the wheel 9 shown in Fig. 1.

If it happens that the main reservoirs 12 and 13 become inoperative, the gates 21, 23, 25 and 26 are locked in closed position and the gates 28 and 27 in the rear walls of the auxiliary reservoirs 15 and 16 opened, and the gates 22 and 24 rendered operative so that the auxiliary reservoirs can be operated in place of the main reservoirs; also if during the operation of the main reservoirs 12 and 13 the reservoir 12 does not furnish sufficient water, both the auxiliary and main reservoirs can be operated simultaneously, so that the wheel 33 can be effectively operated.

When it is desired to facilitate the emptying of the main discharge reservoir 13 the gate 26 in the reservoir 13 is closed and the gates 30 and 31 opened, so that the water passing through the flume 20 can escape through the canal 18; also when it is desired to facilitate the filling of the reservoir 12 the gate 25 is closed and the gates 29 and 32 opened so that the water will be prevented from escaping from the reservoir 12 and to admit of the water passing into the canals 17 and 19 flowing through the flume 20 to effect operation of the wheel 33.

The auxiliary reservoir 15 is adapted to be filled, at spring tides, and the water therein retained for emergency purposes.

The gate 7, shown in Figs. 1, 2 and 3, and the gates 25, 26, 27, 28, 29, 30, 31, and 32 in Figs. 4 and 5, are vertically movable and carry rack bars 34, having the teeth thereon meshing with cog wheels 35 mounted on suitable operating shafts.

Having thus described my invention what I claim as new, is:

1. A tidal hydraulic plant comprising a body, a central partition extending across the body and dividing the same into an accumulating reservoir and a discharge reservoir, said accumulating reservoir being of less depth than the discharge reservoir, the partition ending short of the rear wall of the body, a flume located in the space between the partition and the rear wall of the body and establishing a communication between the reservoirs, a gate located at one end of the flume, a water wheel located centrally within the flume, outswinging gates connected to the discharge reservoir, and inwardly swinging gates carried by the accumulating reservoir.

2. A tidal hydraulic plant comprising a pair of accumulating reservoirs, a canal located between the reservoirs, a pair of discharge reservoirs, a canal located between the discharge reservoirs, said canals having their forward ends opening out to the sea, a third canal at the rear end of the reservoir and establishing a communication between the reservoir and the first mentioned canals, a flume located within the third canal, a water wheel in the flume, independently operated means for establishing a communication between each of the reservoirs and the third canal, and independently operated means for establishing a communication between the first and second mentioned canals with the third canal, and gates regulating the flow of water from each of the reservoirs, as and for the purpose specified.

In testimony whereof I affix my signature in presence of two witnesses.

THOMAS M. RIVERS.

Witnesses:
J. K. ATTWOOD,
J. W. MILLER, Jr.

Copies of this patent may be obtained for five cents each, by addressing the "Commissioner of Patents, Washington, D. C."